United States Patent [19]

Elias

[11] 4,406,729

[45] Sep. 27, 1983

[54] ROUND EDGE FORMER

[75] Inventor: Gilbert N. Elias, Phoenix, Ariz.

[73] Assignee: Evans Rotork, Inc., Glendale, Ariz.

[21] Appl. No.: 318,047

[22] Filed: Nov. 4, 1981

[51] Int. Cl.³ .............................................. B32B 17/04
[52] U.S. Cl. .................................... 156/479; 156/475; 156/481; 156/216
[58] Field of Search ............... 156/216, 475, 479, 480, 156/481, 443

[56] References Cited

U.S. PATENT DOCUMENTS

| 2,937,689 | 5/1960 | Peterson | 156/216 |
| 3,580,770 | 5/1971 | Dyal | 156/216 |
| 3,668,033 | 6/1972 | Evans | 156/216 |
| 3,977,932 | 8/1976 | Fries et al. | 156/216 |
| 4,035,224 | 7/1977 | Anderson | 156/216 |
| 4,334,947 | 6/1982 | Zaino | 156/216 |

Primary Examiner—Edward C. Kimlin
Assistant Examiner—Timothy W. Heitbrink
Attorney, Agent, or Firm—Cahill, Sutton & Thomas

[57] ABSTRACT

A manually operated guide forms a sheet of heated pliable laminate about an adhesively coated 180° rounded edge of a substrate, such as may be found on the front edge of a countertop. The guide is pivotally attached to a support member at an initial angle to guide the laminate along the major portion of the rounded edge and at a different angle to guide the laminate along the remaining portion to assure continuing progressive contact between the laminate and the rounded edge.

6 Claims, 11 Drawing Figures

ROUND EDGE FORMER

The invention is an improvement to the manually operated laminating apparatus described in U.S. Pat. No. 3,668,033, which patent is incorporated herein by reference.

A substantial number of kitchen countertops are formed of a particle board substrate with an adhesively attached laminate of sheet plastic. Usually, such countertops have a 90° rounded top front edge about which the laminate is bent to a vertical plane and terminated. Apparatus for this purpose includes highly automated apparatus particularly suitable for high production rate facilities. For relatively small production rate facilities and for special order laminated countertops, manually operated machinery is most often used. The manually operated machinery generally operates upon principles different from that of the automated machinery mainly because economies in material handling procedures of mass production equipment are not feasible in low production apparatus.

The state of the art in manually operated countertop laminate attaching apparatus is represented by U.S. Pat. No. 3,668,033. Herein, a substrate is placed upon a lower table or platen, a sheet of laminate is attached thereto after adhesive has been applied to the substrate. An upper platen is lowered to press the laminate onto the substrate and effect a good bond. The usual 90° rounded top front edge of the substrate extends lateral of the upper platen along with a segment of the laminate to be adhered thereto. A source of heat, nominally radiant heat, is applied to the segment of laminate to heat it and render it pliable. An edge member, pivotally attached to the upper platen is rotated downwardly to come into contact with the pliable laminate and bend and guide it about the 90° rounded top front edge of the substrate. The guiding action produces essentially continuing progressive contact between the laminate and the substrate to effect a good bond with the interposed adhesive. Excess laminate protruding beyond the lower front edge of the substrate is removed by conventional trimming operations. This apparatus functions admirably well for 90° rounded top front edges but cannot accommodate a 180° rounded front edge.

The invention described below is directed to a guide pivotally attached to the edge member, which edge member is described above and in U.S. Pat. No. 3,668,033. The guide is set at a first angle with respect to the edge member to guide and force the laminate about a major portion of a 180° rounded front edge of a substrate. To effect final guiding of the laminate about the rounded edge and adjacent the under surface of the substrate extending rearwardly from the rounded edge, the guide is set at a second angle. On completion of the pivotal movement of the guide, a portion thereof is adjacent the laminate and maintains the latter in planar contact with the undersurface of the substrate. The guide is removably attached to the edge member whereby it may be removed to permit use of the manually operated laminating apparatus to laminate substrates having 90° rounded top front edge.

It is therefore a primary object of the present invention to provide a guide for manually operated laminating apparatus to attach a laminate about a 180° rounded edge of a substrate.

Another object of the present invention is to provide a relatively inexpensive attachment to existing manually operated laminating apparatus to broaden the scope of work product formable therewith.

Still another object of the present invention is to provide a retrofit kit for manually operated laminating apparatus to laminate substrates having a 180° rounded edge.

A further object of the present invention is to provide a guide for wrapping a laminate about a 180° rounded edge of a substrate by exerting continuing progressive contact between the laminate and the wrapped substrate.

A still further object of the present invention is to provide an attachment to existing manually operated laminating apparatus to increase the scope of products formable thereon without requiring removal of existing equipment or additional hold down or positioning fittings.

These and other objects of the present invention will become apparent to those skilled in the art as the description thereof proceeds.

The present invention may be described with greater specificity and clarity with reference to the following drawings, in which:

FIGS. 4a, 4b and 4c illustrate three steps in forming a laminate about a 180° rounded front edge of a substrate;

Figure 1:
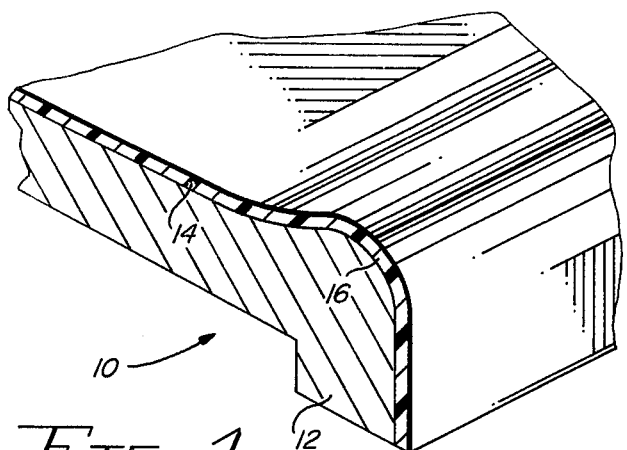
FIG. 1 is a partial cutaway view of a prior art laminate covered countertop having a 90° rounded front top edge.

Widely used counter tops installed in the last fifteen to twenty years have a particle board or a wood frame substrate with the top surface covered by a sheet of plastic laminate adhered thereto. The front edge of the countertop may be squared or the front top edge may be rounded through an angle of 90°. Some countertop front top edges, as illustrated in FIG. 1, may have a double curved front top edge; that is, they may curve somewhat upwardly from the surface defined by the laminate and thereafter curve downwardly to a vertical orientation. The apparatus described and illustrated in U.S. Pat. No. 3,668,033 can be employed to manually cause bonding of the laminate to the substrate along the planar surface and about either a single or a double curved front top edge.

Figure 2:
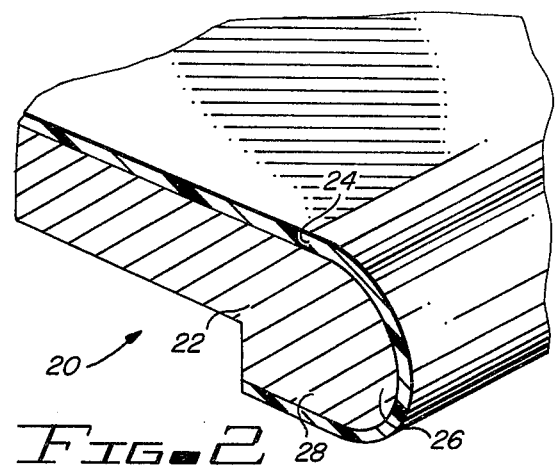
FIG. 2 is a partial cutaway view of a laminate covered counter top having a 180° rounded front edge.

Recently, countertops having a 180° rounded front edge, as illustrated in FIG. 2, have come into vogue. Such countertops can be readily manufactured by automated equipment employing a series of rollers to progressively roll the laminate about the edge. However, manually operated apparatus, such as described in U.S. Pat. No. 3,668,033, is incapable of providing the requisite progressive guiding function to attach the laminate about the curved edge and along a section of the under surface of the substrate.

Figure 3A:
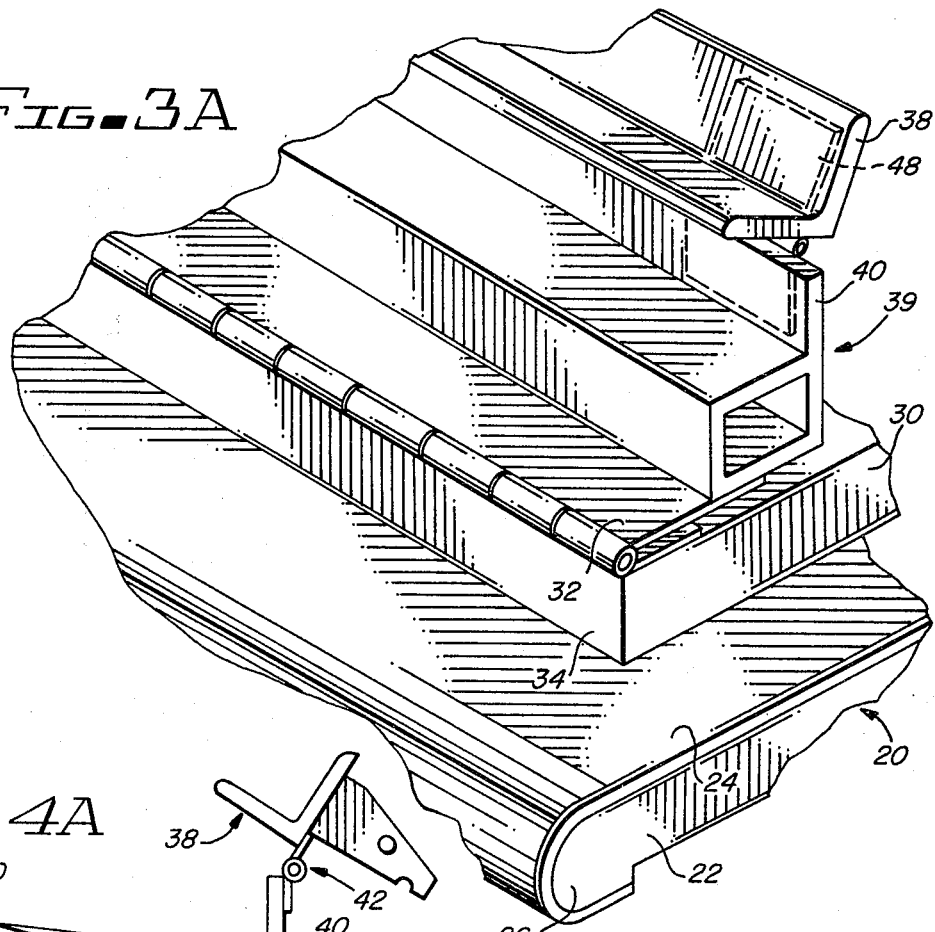
FIGS. 3a, 3b and 3c illustrate the structure of the present invention in each of three primary positions.

Referring to FIG. 3a, the general arrangement of the present invention as an attachment to the manually operated laminating apparatus discussed in detail in U.S. Pat. No. 3,668,033 will be described.

Countertop 20, having a 180° rounded edge 26 is placed upon a lower platen (not shown) and clamped thereagainst by upper platen 30. A hinge 32, which may be a piano hinge, is attached along edge 34 of the upper platen and to member 39. The member may be an aluminum extrusion having a "P" shaped cross-section; it may be noted that this member corresponds in position and function with spacer block 74 and moveable edge member 68 of the laminating apparatus shown in FIG. 1 in U.S. Pat. No. 3,668,033. A guide 38 performs the major guiding function of progressively wrapping laminate 24 about edge 26 of substrate 22. The guide is pivotally attached to spine 40 of member 39, as shown in further detail in FIGS. 3b and 3c.

Figure 3B:
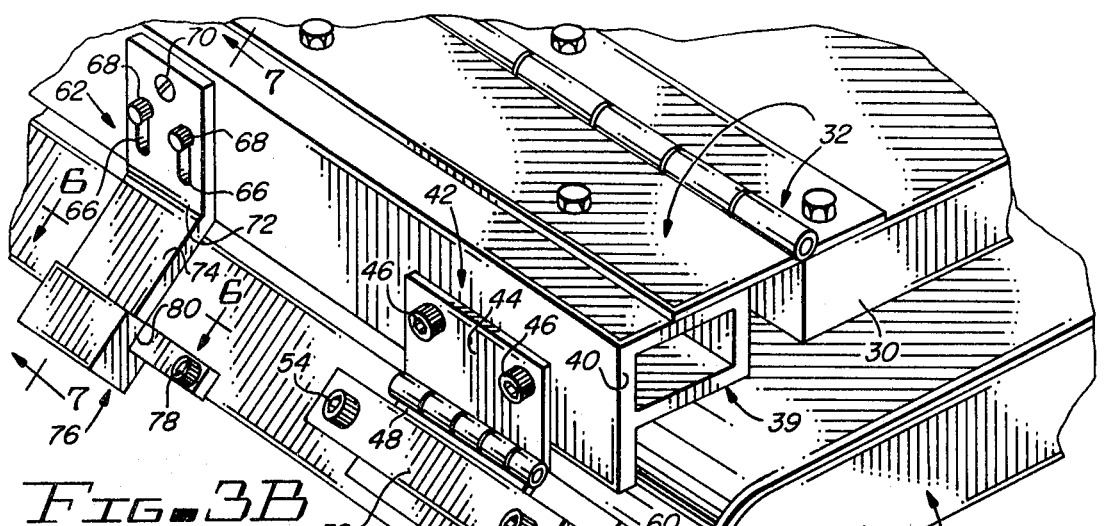
Figure 3C:
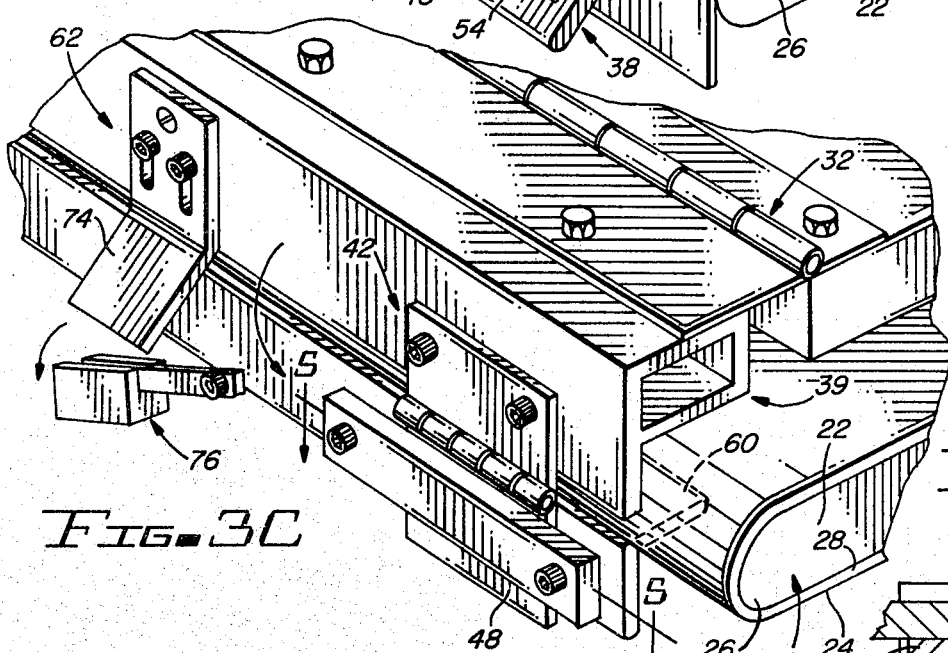
Figure 5:
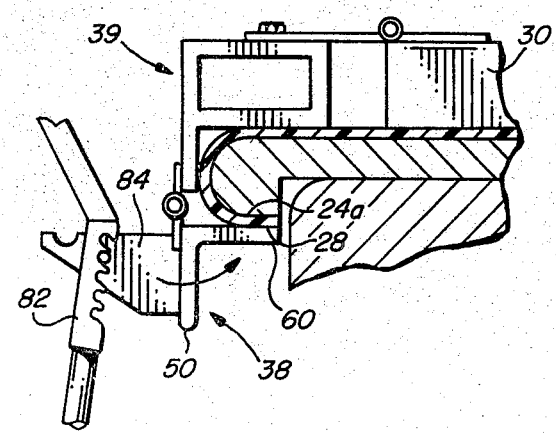
FIG. 5 is a cross-sectional view taken along lines 5—5, as shown in FIG. 3c.
Figure 5:
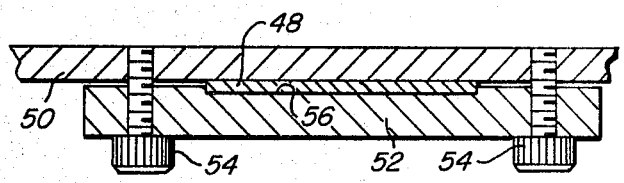

Member 39, without guide 38, may be used to attach a laminate to a substrate having a 90° rounded front top edge, as depicted in FIG. 1. To attach a laminate 24 about a 180° rounded edge 26 of a substrate 22, as shown in FIG. 2, guide 39 is attached to spine 40 of member 36 by a plurality of hinges, of which hinge 42 is illustrated in FIGS. 3b and 3c. Side 44 of the hinge is attached to spine 40 by Allen head screws 46 or other attachment means. Side 48 of the hinge is attached to flange 50 of guide 38 by a bracket 52 (see FIG. 5) engaged by Allen head screws 54 or the like. The bracket includes a recessed slot 56 dimensioned in depth to receive less than the thickness of side 48 of hinge 42; tightening of Allen head screws 54 will cause bracket 52 to frictionally retain side 48 against flange 50. Thereby, the spacing between guide 38 and member 39 may be readily varied to accommodate different thickness substrates 22, for reasons which will be discussed below.

To accommodate a continuing guiding function upon the laminate during its attachment to the substrate, flange 60 of guide 38 may not be oriented at a right angle with respect to the plane defined by spine 40. The angle at which the flange is maintained initially is set by angled bracket 62. The bracket includes an upper leg 64 having a pair of slots 66 disposed therein. These slots cooperate with studs 68 extending from spine 40 to accommodate rectilinear adjustment of the leg along an axis defined by the slots. An adjustment screw 70 adjustably locks the bracket with respect to member 39. The positioning of the bracket with respect to spine 40 is dependent upon and a function of the pivot axis of the hinges such that the pivot axis is essentially coincident with bend line 72 of the bracket.

Figure 7:
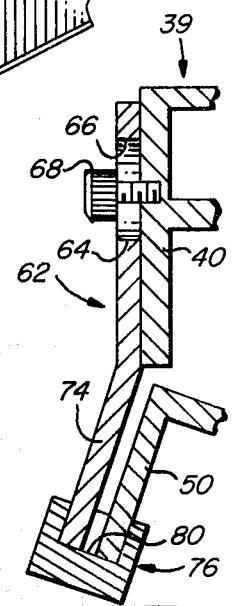
FIG. 7 is a cross-sectional view taken along lines 7—7, as shown in FIG. 3b.
Figure 6:
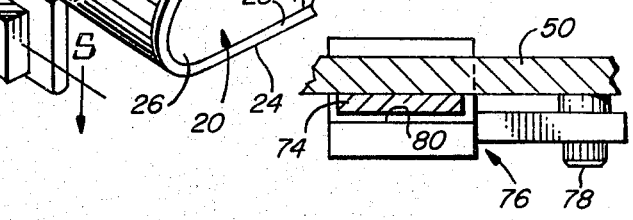
FIG. 6 is a partial cross-sectional view taken along lines 6—6, as shown in FIG. 3b.

Leg 74 of the bracket is detachably attached adjacent flange 50 by means of a pivotally attached lock bar 76; reference may also be made to FIGS. 6 and 7. The lock bar is pivotally attached to flange 50 by pivot pin 78. A channel 80 is formed within the lock bar to receive the edges of leg 74 and flange 50 when the leg and flange are adjacent one another, as particularly shown in FIG. 7. Upon such locking, pivotal movement intermediate member 39 and guide 38 is precluded.

Upon downward rotation of lock bar 76, as particularly shown in FIG. 3c, guide 38 is free to pivot and may be manually pivoted downwardly until flange 50 is essentially in alignment with spine 40. In this position, flange 60 of guide 38 is adjacent laminate 24 disposed in contacting relationship to under surface 28 of substrate 22, as also shown in FIG. 4c. As member 39 rests upon the upper surface of counter top 20, good adhesion between the laminate and the under surface is achieved by the resulting somewhat compressive effect. The point of attachment between side 48 of hinge 42 and flange 50 of guide 38 is set commensurate with the thickness of the countertop edge to ensure juxtapositioning of the laminate with top and undersurface of the substrate. Moreover, the adjustable attachment capability permits lamination of a wide range of substrate thicknesses.

Figure 4A:
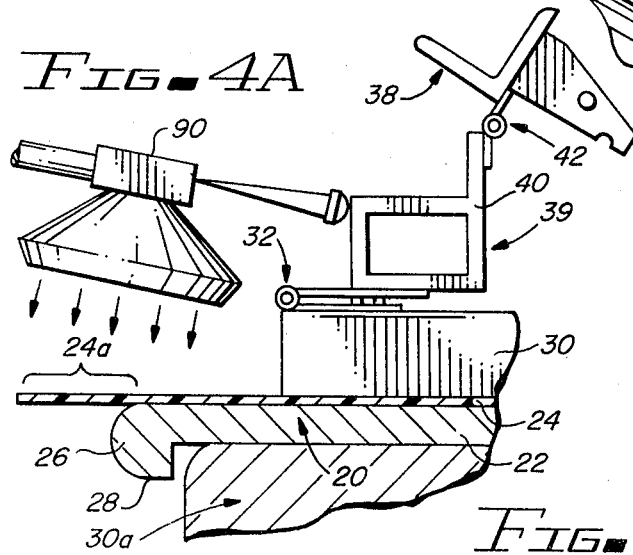
Figure 4B:
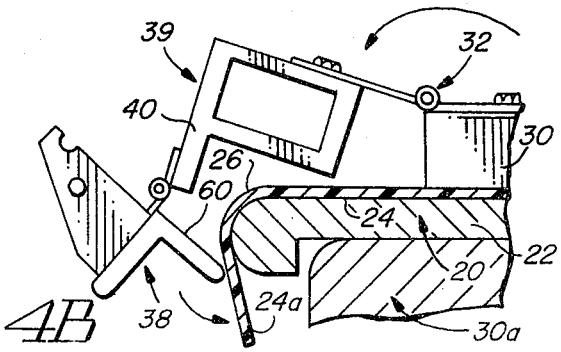

Turning now to FIGS. 4a, 4b and 4c, the steps for exercising the above described apparatus and conducting the method of the present invention for laminating a 180° rounded edge will be described. After laminate 24 has been affixed to the upper horizontal planar surface of substrate 22 by compressing countertop 20 between upper platen 30 and lower platen 30a, a heat source 90, which may be a source of radiant energy, is brought into operative contact with laminate segment 24a extending laterally from rounded edge 26 to heat and render pliable the segment. Normally, contact adhesive or the like will have been preapplied to the surface of the rounded edge. It is presumed that guide 38 has been angularly fixed with respect to member 39 by engagement of lock bar 76.

After sufficient pliancy of segment 24a has been achieved, member 39 is rotated about the hinge line of hinge 32, as illustrated in FIG. 4b. The resulting pivotal movement of guide 38 (which is preferably a right angle section) causes the edge of flange 60 to come into contacting relationship with segment 24a and partially bend it about rounded edge 26 in a continuing progressive manner to obtain contact therebetween and adherence thereto by the preapplied adhesive. Were guide 38 not angled with respect to member 39, the edge of flange 60 would come into interfering contacting relationship with the lower portion of rounded edge 26 and preclude further movement or else cause damage to the laminate or the substrate. Once past the critical point along the rounded edge, lock bar 76 is released to permit manual pivotal movement of guide 38 with respect to member 39 to locate the guide in the position shown in FIG. 4c; the final bending of the segment is assured by the force exerted thereupon by the pivotal movement of the guide with respect to member 39. In this position, which position may be maintained by a locking device 82 cooperating with an arm 84 extending from flange 60 as described in further detail in U.S. Pat. No. 3,668,033, flange 60 bears against segment 24a positioned adjacent under surface 28 of the substrate to ensure adhesion therebetween.

Upon curing of the adhesive, device 82 is disengaged from bracket 84, guide 38 is pivoted free of rounded edge 26 to permit member 39 to pivot out of contact with the countertop. Subsequent raising of platen 30 released the countertop and it may be removed from the laminating apparatus.

From the above description, it will become apparent that the attachment to the existing manually operated laminating apparatus described in U.S. Pat. No. 3,668,033, is developed from very few parts and which parts are easily and readily attached to existing elements in situ. Thereby, the attachment is relatively inexpensive and provides a substantial additional scope to the utility of the existing manually operated laminating apparatus.

While the principles of the invention have now been made clear in an illustrative embodiment, there will be immediately obvious to those skilled in the art many modifications of structure, arrangement, proportions, elements, materials, and components, used in the practice of the invention which are particularly adapted for specific environments and operating requirements without departing from those principles.

I claim:

1. Apparatus for attaching a laminate to the top and bottom side of a substrate and about a 180° rounded edge of the substrate joining the top and bottom sides, said apparatus comprising in combination:
   (a) a pivotally mounted member for forcing the laminate against the top side of the substrate upon pivotal movement of said member;
   (b) a spine extending from said member for guiding the laminate adjacent the substrate from the top side of the substrate to the apex of the rounded edge of the substrate and for bearing against the apex of the rounded edge to maintain the laminate thereagainst on completion of the pivotal movement of said member; and
   (c) a guide pivotally secured to said member for guiding the laminate adjacent the substrate from the apex of the rounded edge of the substrate to the bottom side of the substrate upon pivotal movement of said guide and for forcing the laminate against the bottom side of the substrate on completion of the pivotal movement of said guide while said spine retains the laminate adjacent the apex of the rounded edge;
   whereby, pivotal movement of said member locates the laminate adjacent the substrate from the top side to the apex of the rounded edge and pivotal movement of said guide locates the laminate adjacent the substrate from the apex of the rounded edge to the bottom side.

2. The apparatus of claim 1 including means for setting the angular relationship of said guide with said member during the initial pivotal movement of said member.

3. The apparatus as set forth in claim 2 including means for modifying the proximity of said guide to said member to accommodate different thickness substrate/laminate configurations.

4. The apparatus as set forth in claim 2 wherein said setting means comprises a bracket attached to said member and a lock for selective engagement of said bracket with said guide.

5. The apparatus as set forth in claim 4 wherein said pivoting means comprises a hinge having a first side attached to said member and wherein said modifying means comprises a hinge bracket for selectively engaging a second side of said hinge with said guide.

6. The apparatus as set forth in claim 5 wherein said hinge bracket includes a slot for the second side of said hinge.

* * * * *